(12) United States Patent
Nishikawa et al.

(10) Patent No.: US 8,179,015 B2
(45) Date of Patent: May 15, 2012

(54) DYNAMOELECTRIC MACHINE

(75) Inventors: Ken Nishikawa, Chiyoda-ku (JP);
Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 346 days.

(21) Appl. No.: 12/627,704

(22) Filed: Nov. 30, 2009

(65) Prior Publication Data

US 2010/0320861 A1 Dec. 23, 2010

(30) Foreign Application Priority Data

Jun. 23, 2009 (JP) ................. 2009-148815

(51) Int. Cl.
*H02K 1/22* (2006.01)
*H02K 1/00* (2006.01)
*H02K 3/00* (2006.01)
*H02K 19/26* (2006.01)
*H02K 21/00* (2006.01)

(52) U.S. Cl. .............. 310/263; 310/156.66; 310/156.69; 310/156.71; 310/156.73; 310/194; 310/257

(58) Field of Classification Search ............. 310/156.66, 310/156.69, 156.71, 156.73, 194, 257, 263; H02K 1/00, 1/22, 3/00, 19/26, 21/00
See application file for complete search history.

(56) References Cited

U.S. PATENT DOCUMENTS

| | | | |
|---|---|---|---|
| 5,483,116 A * | 1/1996 | Kusase et al. ................. | 310/263 |
| 6,172,441 B1 * | 1/2001 | York et al. ..................... | 310/263 |
| 6,747,384 B2 * | 6/2004 | Militello et al. ......... | 310/156.08 |
| 6,853,111 B2 * | 2/2005 | Umeda et al. ................. | 310/263 |
| 7,053,515 B2 * | 5/2006 | Nakanishi et al. ............. | 310/194 |
| 2002/0005673 A1 * | 1/2002 | Umeda et al. ............. | 310/156.11 |
| 2003/0137208 A1 * | 7/2003 | York et al. ..................... | 310/194 |
| 2003/0137212 A1 * | 7/2003 | Militello et al. ............... | 310/263 |
| 2005/0218744 A1 * | 10/2005 | Nakanishi et al. ............. | 310/194 |
| 2010/0320861 A1 * | 12/2010 | Nishikawa et al. ............ | 310/194 |
| 2011/0043068 A1 * | 2/2011 | Yoshizawa et al. ........... | 310/181 |
| 2011/0181142 A1 * | 7/2011 | Yoshizawa et al. ....... | 310/156.12 |

FOREIGN PATENT DOCUMENTS

| | | |
|---|---|---|
| JP | 10-136623 A | 5/1998 |
| JP | 2003-244875 A | 8/2003 |
| JP | 2006-197737 A | 7/2006 |
| JP | 2008-228485 A | 9/2008 |
| JP | 2009050074 A | 3/2009 |

* cited by examiner

*Primary Examiner* — John K Kim
(74) *Attorney, Agent, or Firm* — Sughrue Mion, PLLC

(57) ABSTRACT

An interfitting groove is disposed in a bottom portion of a trough portion so as to have a groove direction that is axial and so as to extend axially outward from axially inside, and a rotation arresting portion housing recess portion is recessed into an axially inner opening edge portion of the interfitting groove on a first yoke portion. A magnet holding seat that holds a permanent magnet is disposed in the trough portion by an interfitting portion being fitted into the interfitting groove such that radial movement is restricted. A rotation arresting portion that is disposed so as to project axially outward from a flange portion of the bobbin is housed inside a space that is constituted by the rotation arresting portion housing recess portion and an external shape reduced portion that extends axially inward from the interfitting groove such that rotation of the bobbin around the shaft is restricted.

7 Claims, 10 Drawing Sheets

FIG. 6A
FIG. 6B
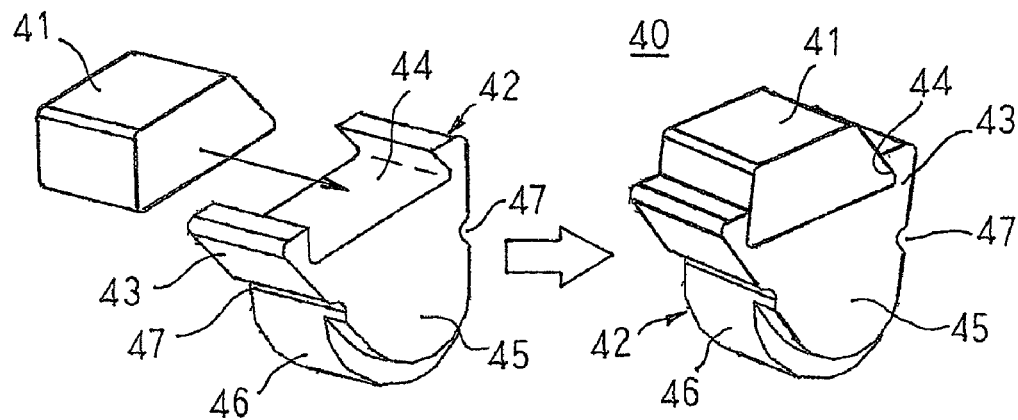
FIG. 7
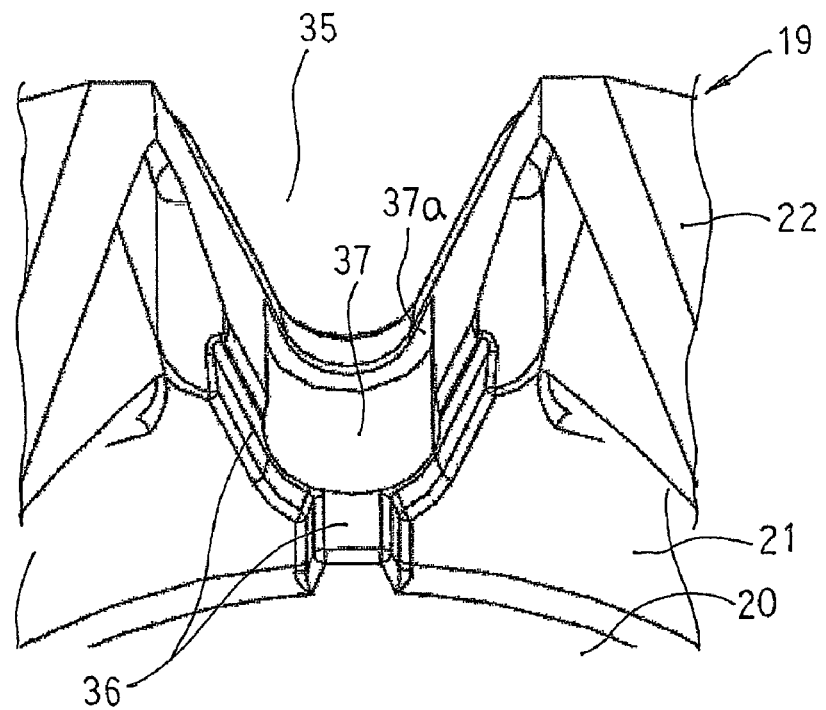

DYNAMOELECTRIC MACHINE

BACKGROUND OF THE INVENTION

1. Field of the Invention

The present invention relates to a dynamoelectric machine such as an automotive alternator, etc., and particularly relates to a permanent magnet holding construction in a Lundell rotor.

2. Description of the Related Art

Automotive alternators that use Lundell rotors have been used in automobiles for decades. Loads from electrical equipment that is mounted due to environmental issues have been increasing rapidly in recent years, and further increases in generated power are being sought from Lundell rotors.

In view of these conditions, generated power has conventionally been increased by disposing permanent magnets on yoke portions of a Lundell rotor so as to face claw-shaped magnetic poles to alleviate magnetic saturation of the pole core (See Patent Literature 1 through 3, for example).

Patent Literature 1: WO/2008/044347 (Pamphlet: FIG. 14)
Patent Literature 2: Japanese Patent Laid-Open No. 2003-244875 (Gazette: FIG. 8)
Patent Literature 3: Japanese Patent Laid-Open No. HEI 10-136623 (Gazette: FIG. 3)

SUMMARY OF THE INVENTION

However, in conventional automotive alternators such as those described in Patent Literature 1 through 3, generated power can be increased by alleviating magnetic saturation of the pole core by disposing permanent magnets, but no consideration has been given to preventing rotation of a bobbin onto which a field coil is wound that is mounted onto a boss portion between the yoke portions. Thus, one disadvantage has been that when conventional automotive alternators are rotated at high speed and a high angular speed is applied to the bobbin, the bobbin may rotate around the axis of the boss portion, causing breakages in output wires of the field coil.

The present invention aims to solve the above problems and an object of the present invention is to provide a dynamoelectric machine that can increase reliability and durability and improve output characteristics by enabling a permanent magnet to be held while preventing rotation of a bobbin onto which a field coil is wound to suppress occurrences of breakages of output wires of the field coil, etc.

In order to achieve the above object, according to one aspect of the present invention, there is provided a dynamoelectric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, a trough portion that curves radially inward being formed on a portion of each of the yoke portions between circumferentially adjacent claw-shaped magnetic pole portions, and the pole core being fixed to a shaft that is inserted through a central axial position of the boss portion; and a field coil that is wound onto a bobbin that is mounted to the boss portion, and that is housed inside a space that is surrounded by the boss portion, the pair of yoke portions, and the plurality of claw-shaped magnetic pole portions; a stator that is disposed so as to surround an outer circumference of the rotor; and a permanent magnet that is disposed in the trough portion so as to face an inner circumferential surface near a tip end of the claw-shaped magnetic pole portions. The dynamoelectric machine includes: an interfitting groove that is disposed in a bottom portion of the trough portion so as to have a groove direction that is axial and so as to extend axially outward from axially inside; a rotation arresting portion housing recess portion that is recessed into an axially inner opening edge portion of the interfitting groove on the yoke portions; a magnet holding seat that is disposed in the trough portion by being fitted into the interfitting groove such that radial movement is restricted, and that holds the permanent magnet; and a rotation arresting portion that is disposed so as to project axially outward from a flange portion of the bobbin, the rotation arresting portion being housed inside a space that is constituted by the rotation arresting portion housing recess portion and the magnet holding seat such that rotation of the bobbin around the shaft is restricted.

According to the present invention, because a rotation arresting portion of a bobbin is housed inside a space that is constituted by a rotation arresting portion housing recess portion that is recessed into an axially inner opening edge portion of an interfitting groove of a yoke portion and a magnet holding seat that is fitted into the interfitting groove, rotation of a bobbin onto which a field coil is wound can be prevented, and the magnet holding seat, which holds a permanent magnet, can also be mounted to a trough portion so as to avoid interference with the rotation arresting portion. Thus, occurrences such as breakages of output wires of the field coil, etc., can be suppressed, increasing reliability and durability, and also improving output characteristics.

BRIEF DESCRIPTION OF THE DRAWINGS

FIG. 6A is a diagram that explains a configuration of a permanent magnet assembly that can be mounted to the rotor that can be used in the automotive alternator according to Embodiment 1 of the present invention;

FIG. 6B is a diagram that explains the configuration of the permanent magnet assembly that can be mounted to the rotor that can be used in the automotive alternator according to Embodiment 1 of the present invention;

FIG. 7 is a perspective that explains a construction of a trough portion of a pole core in the rotor that can be used in the automotive alternator according to Embodiment 1 of the present invention;

DETAILED DESCRIPTION OF THE PREFERRED EMBODIMENTS

Embodiment 1

Figure 1:
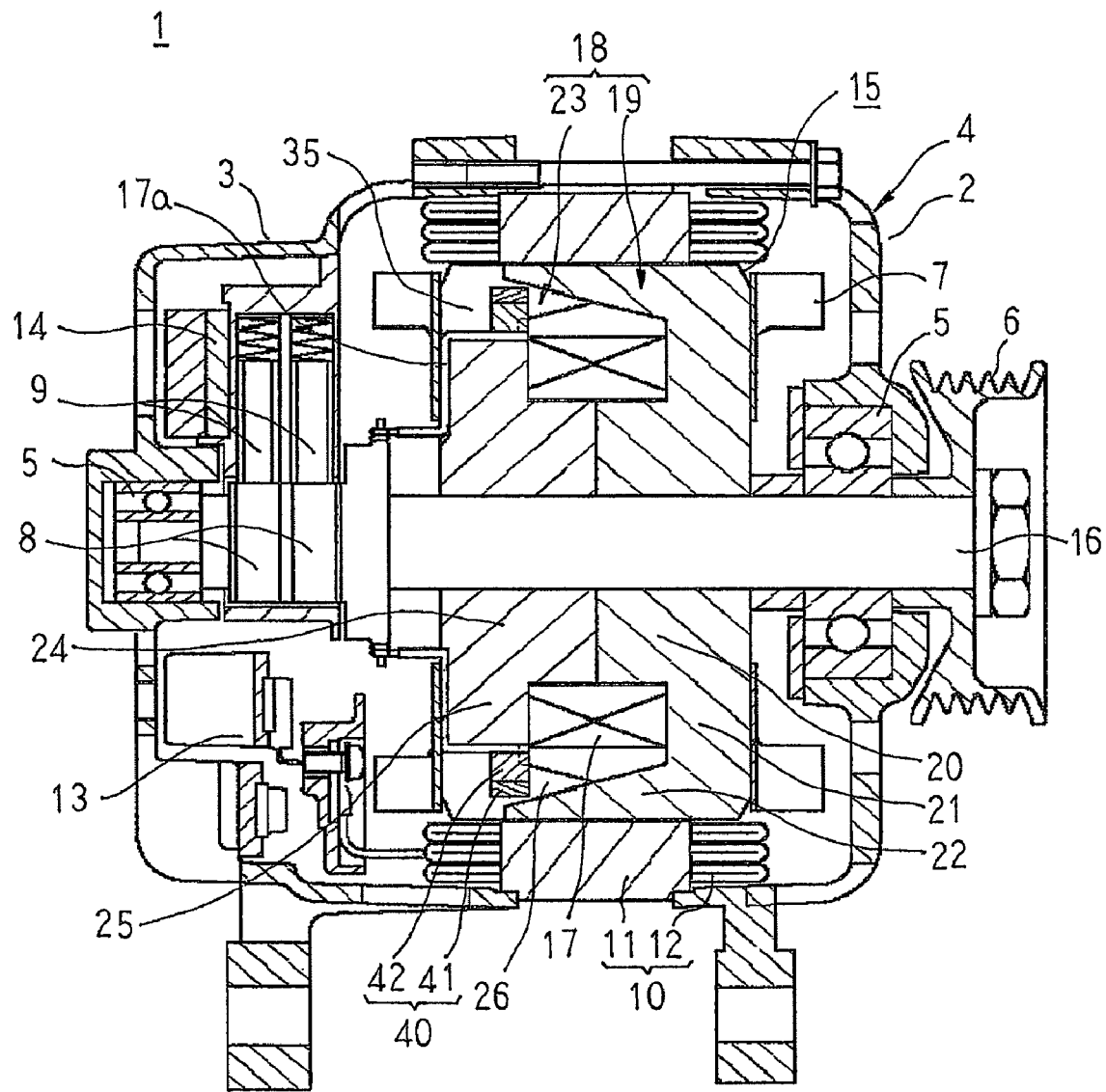
FIG. 1 is a cross section that schematically shows an automotive alternator according to Embodiment 1 of the present invention.
Figure 2:
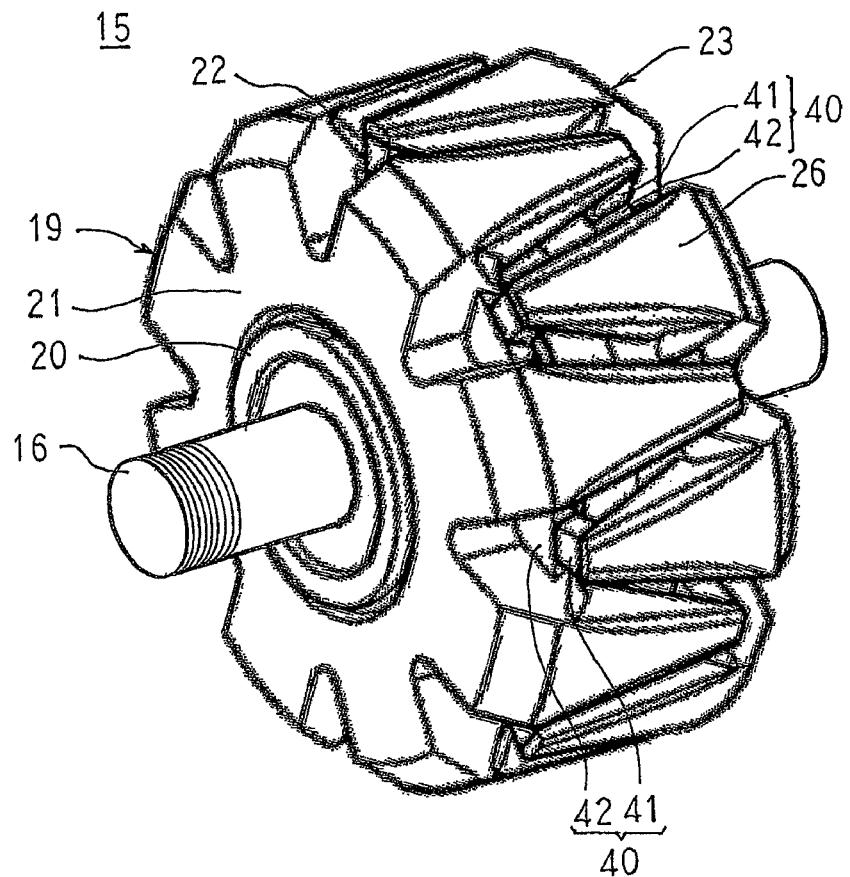
FIG. 2 is a perspective of a rotor that can be used in the automotive alternator according to Embodiment 1 of the present invention.
Figure 3:
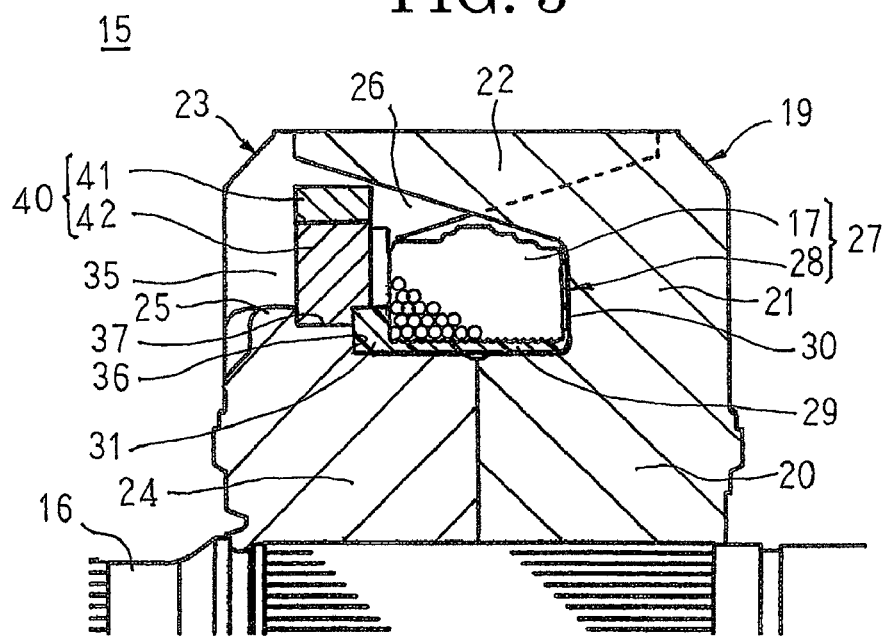
FIG. 3 is a cross section of the rotor that can be used in the automotive alternator according to Embodiment 1 of the present invention.
Figure 4:
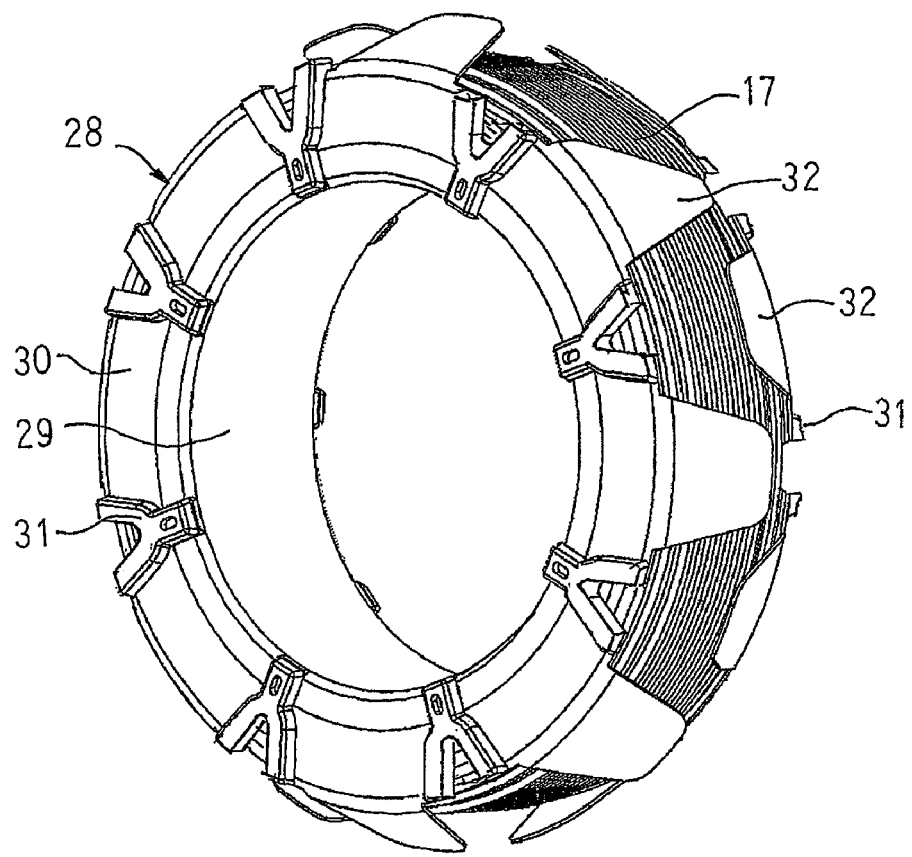
FIG. 4 is a perspective of a field coil assembly that can be installed in the rotor that can be used in the automotive alternator according to Embodiment 1 of the present invention.
Figure 5:
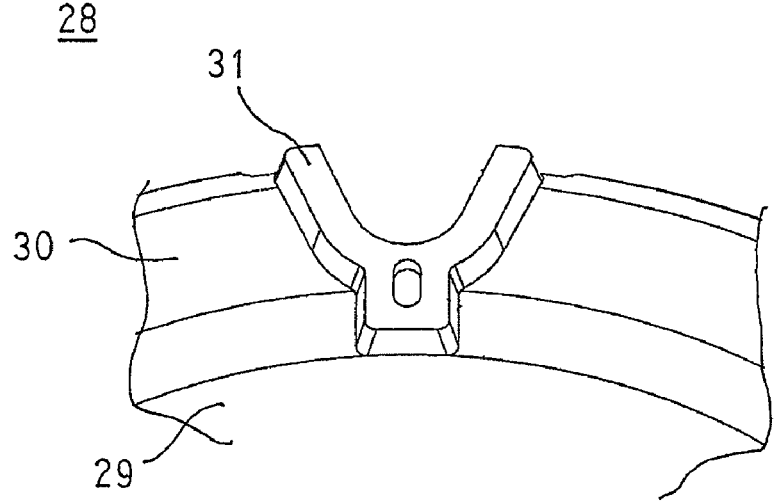
FIG. 5 is a side elevation of part of a bobbin of the field coil assembly that can be installed in the rotor that can be used in the automotive alternator according to Embodiment 1 of the present invention.
Figure 8:
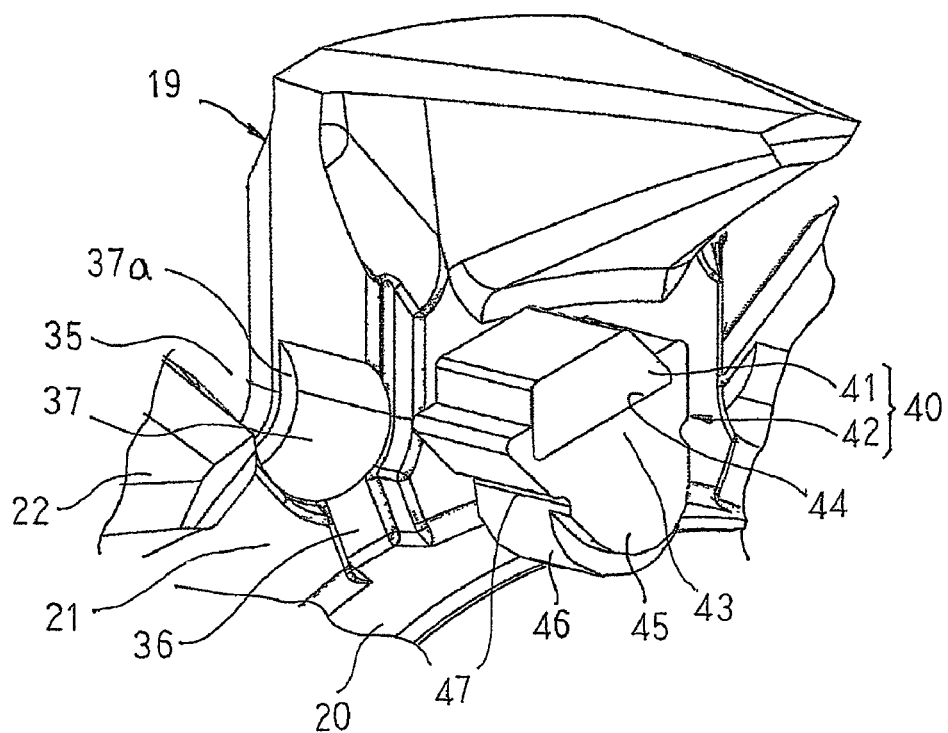
FIG. 8 is a perspective that explains a method for mounting the permanent magnet assembly to the pole core in the automotive alternator according to Embodiment 1 of the present invention.
Figure 9A:
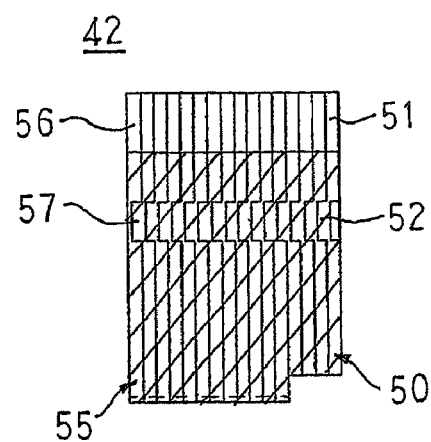
FIG. 9A is a cross section that explains a configuration of a magnet holding seat of the permanent magnet assembly in the automotive alternator according to Embodiment 1 of the present invention.
Figure 9B:
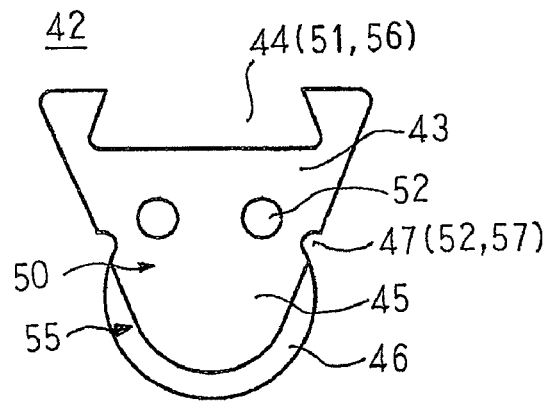
FIG. 9B is a front elevation that explains the configuration of the magnet holding seat of the permanent magnet assembly in the automotive alternator according to Embodiment 1 of the present invention.
Figure 10A:
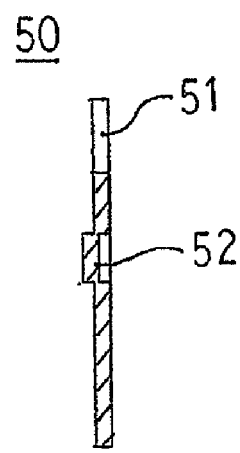
FIG. 10A is a cross section that explains the configuration of the magnet holding seat of the permanent magnet assembly in the automotive alternator according to Embodiment 1 of the present invention.
Figure 10B:
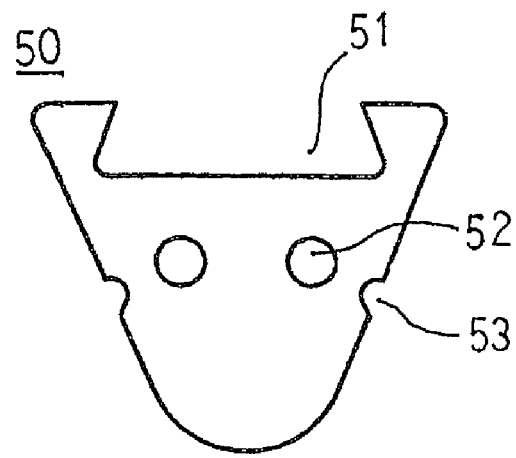
FIG. 10B is a front elevation that explains the configuration of the magnet holding seat of the permanent magnet assembly in the automotive alternator according to Embodiment 1 of the present invention.
Figure 11A:
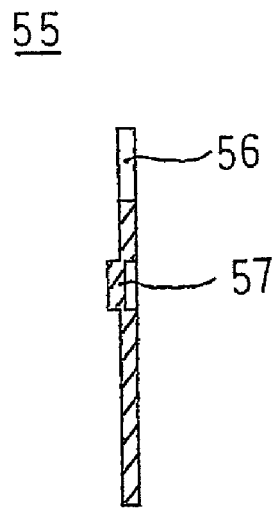
FIG. 11A is a cross section that explains the configuration of the magnet holding seat of the permanent magnet assembly in the automotive alternator according to Embodiment 1 of the present invention.
Figure 11B:
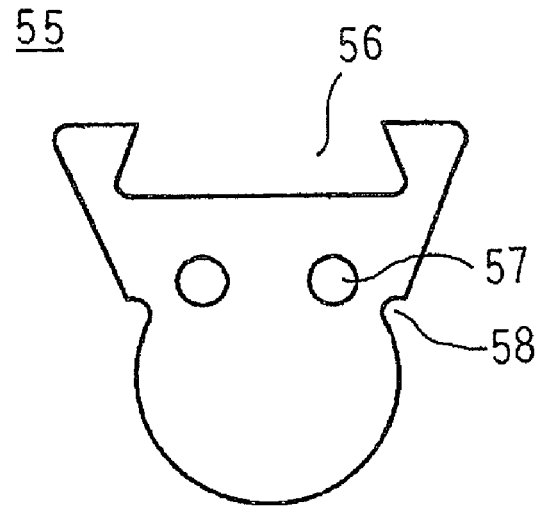
FIG. 11B is a front elevation that explains the configuration of the magnet holding seat of the permanent magnet assembly in the automotive alternator according to Embodiment 1 of the present invention.
Figure 12A:
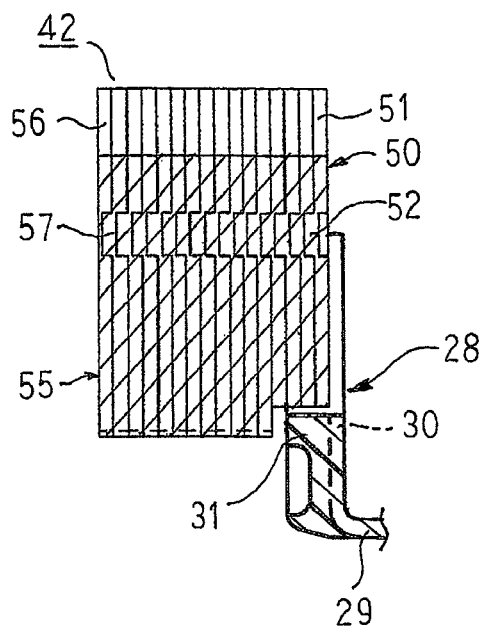
FIG. 12A is a cross section that explains a relationship between the magnet holding seat and a rotation arresting portion of the bobbin in the automotive alternator according to Embodiment 1 of the present invention.
Figure 12B:
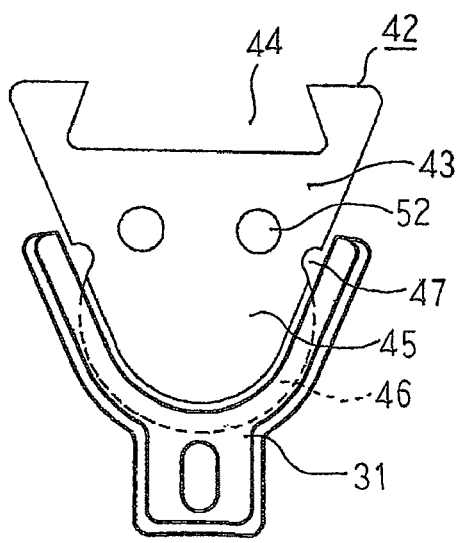
FIG. 12B is a front elevation that explains the relationship between the magnet holding seat and the rotation arresting portion of the bobbin in the automotive alternator according to Embodiment 1 of the present invention.

FIG. 1 is a cross section that schematically shows an automotive alternator according to Embodiment 1 of the present invention, FIG. 2 is a perspective of a rotor that can be used in the automotive alternator according to Embodiment 1 of the present invention, FIG. 3 is a cross section of the rotor that can be used in the automotive alternator according to Embodiment 1 of the present invention, FIG. 4 is a perspective of a field coil assembly that can be installed in the rotor that can be used in the automotive alternator according to Embodiment 1 of the present invention, and FIG. 5 is a side elevation of part of a bobbin of the field coil assembly that can be installed in the rotor that can be used in the automotive alternator according to Embodiment 1 of the present invention. FIGS. 6A and 6B are diagrams that explain a configuration of a permanent magnet assembly that can be mounted to the rotor that can be used in the automotive alternator according to Embodiment 1 of the present invention, FIG. 6A showing a step of mounting the permanent magnet, and FIG. 6B showing a mounted state of the permanent magnet. FIG. 7 is a perspective that explains a construction of a trough portion of a pole core in the rotor that can be used in the automotive alternator according to Embodiment 1 of the present invention, and FIG. 8 is a perspective that explains a method for mounting the permanent magnet assembly to the pole core in the automotive alternator according to Embodiment 1 of the present invention. FIGS. 9A and 9B are diagrams that explain a configuration of a magnet holding seat of the permanent magnet assembly in the automotive alternator according to Embodiment 1 of the present invention, FIG. 9A showing a cross section thereof and FIG. 9B showing a front elevation. FIGS. 10A and 10B are diagrams that explain the configuration of the magnet holding seat of the permanent magnet assembly in the automotive alternator according to Embodiment 1 of the present invention, FIG. 10A showing a cross section thereof and FIG. 10B showing a front elevation. FIGS. 11A and 11B are diagrams that explain the configuration of the magnet holding seat of the permanent magnet assembly in the automotive alternator according to Embodiment 1 of the present invention, FIG. 11A showing a cross section thereof and FIG. 11B showing a front elevation. FIGS. 12A and 12B are diagrams that explain a relationship between the magnet holding seat and a rotation arresting portion of the bobbin in the automotive alternator according to Embodiment 1 of the present invention, FIG. 12A showing a cross section thereof and FIG. 12B showing a front elevation.

In FIGS. 1 through 5, an automotive alternator 1 that functions as a dynamoelectric machine includes: a case 4 that is constituted by a front bracket 2 and a rear bracket 3 that are each made of aluminum so as to have an approximate cup shape; a rotor 15 that is rotatably disposed inside the case 4 such that a shaft 16 is supported by means of bearings 5 in the case 4; a pulley 6 that is fixed to an end portion of the shaft 16 that extends outward at a front end of the case 4; fans 7 that are fixed to two axial end surfaces of the rotor 15; a stator 10 that is fixed to the case 4 so as to surround an outer circumference of the rotor 15 so as to have a constant air gap relative to the rotor 15; a pair of slip rings 8 that are fixed to a rear end of the shaft 16, and that supply current to the rotor 15; a pair of brushes 9 that are disposed inside the case 4 so as to slide on the respective slip rings 8; a rectifier 13 that rectifies an alternating current that is generated in the stator 10 into direct current; and a voltage regulator 14 that adjusts magnitude of an alternating voltage that is generated in the stator 10.

The stator 10 includes: a cylindrical stator core 11; and a stator coil 12 that is mounted to the stator core 11, and in which an alternating current arises due to changes in magnetic flux from a field coil 17 (described below) that accompany rotation of the rotor 15.

The rotor 15 includes: a field coil 17 that generates magnetic flux on passage of an excitation current; a pole core 18 that is disposed so as to cover the field coil 17 and in which magnetic poles are formed by that magnetic flux; and the shaft 16, which is fitted through a central axial position of the pole core 18.

The pole core 18 is configured so as to be divided into first and second pole core bodies 19 and 23 that are each prepared by a cold forging manufacturing method using a low carbon steel such as S10C, for example.

The first pole core body 19 has: a first boss portion 20 that has an outer circumferential surface that has a cylindrical shape, and in which a shaft insertion aperture is formed so as to pass through at a central axial position; a thick ring-shaped first yoke portion 21 that is disposed so as to extend radially outward from a first end edge portion of the first boss portion 20; and first claw-shaped magnetic pole portions 22 that are disposed so as to extend toward a second axial end from outer circumferential portions of the first yoke portion 21. Eight, for example, first claw-shaped magnetic pole portions 22 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 21 at a uniform angular pitch circumferentially.

The second pole core body 23 has: a second boss portion 24 that has an outer circumferential surface that has a cylindrical shape, and in which a shaft insertion aperture is formed so as to pass through at a central axial position; a thick ring-shaped second yoke portion 25 that is disposed so as to extend radially outward from a second end edge portion of the second boss portion 24; and second claw-shaped magnetic pole portions 26 that are disposed so as to extend toward a first axial end from outer circumferential portions of the second yoke portion 25. Eight, for example, second claw-shaped magnetic pole portions 26 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 25 at a uniform angular pitch circumferentially.

The bobbin 28 is a resin-molded body that is made of an insulating resin, and includes: a drum portion 29 that is mounted so as to be fitted over the first and second boss portions 20 and 24; a pair of flange portions 30 that are disposed so as to extend radially outward from two axial ends of the drum portion 29; eight rotation arresting portions 31 that are disposed so as to project at a uniform angular pitch from each of the pair of flange portions 30; and cover portions 32 that are disposed so as to extend from outer circumferential edge portions of the pair of flange portions 30 so as to cover the field coil 17 that is wound onto the drum portion 29. Each of the rotation arresting portions 31 is configured so as to have a Y-shaped thick portion that is disposed so as to project axially outward from each of the flange portions 30. A field coil assembly 27 is prepared by winding a conducting wire that constitutes the field coil 17 into multiple layers on the drum portion 29 of the bobbin 28.

As shown in FIG. 7, trough portions 35 are recessed so as to have U-shaped walls that curve concavely radially inward at respective portions of the first yoke portion 21 between circumferentially adjacent first claw-shaped magnetic pole portions 22. These trough portions 35 that are curved radially inward pass through the first yoke portion 21 axially such that circumferential widths thereof become gradually narrower toward a radially inner side. Rotation arresting portion housing recess portions 36 are recessed into (axially inner) edge portions of the trough portions 35 near the field coil 17 and into axially inner portions of the first yoke portion 21 at lower portions of the trough portions 35 so as to have axial depths that are equal to wall thicknesses of the rotation arresting portions 31 and internal shapes that conform to external shapes of the rotation arresting portions 31. In addition, interfitting grooves 37 that have major arc cross sections are formed so as to expand near a floor portion of the trough portions 35 so as to have groove directions that are axial, and so as to have predetermined lengths outward from axially inside. Here, the interfitting grooves 37 do not pass through the trough portions 35 of the first yoke portion 21 axially, but have bottom surfaces 37a that are perpendicular to an axial direction that function as stopping portions.

Moreover, although not explained, trough portions 35, rotation arresting portion housing recess portions 36, and interfitting grooves 37 are also formed on the second yoke portion 25 in a similar manner.

As shown in FIG. 6B, a permanent magnet assembly 40 includes: a permanent magnet 41; and a magnet holding seat 42 that fits over and holds the permanent magnet 41. The permanent magnet 41 is prepared into a columnar body that has a predetermined length that has a cross-sectional shape that is an isosceles trapezoid using a neodymium-iron-boron rare earth sintered magnet, for example.

The magnet holding seat 42 is configured using a magnetic material into a columnar body that has a composite cross-sectional shape that aligns an upper side (a short side) of an isosceles trapezoid with a chord of a major arc and that has a thickness that is approximately equal to the length of the permanent magnet 41. A magnet holding portion 43 that is constituted by a columnar portion that has an isosceles trapezoidal cross section is prepared so as to have a shape that can be fitted between side surfaces of a trough portion 35 that face each other circumferentially when the permanent magnet assembly 40 is mounted to the trough portion 35. A magnet interfitting groove 44 is recessed into a bottom surface of the magnet holding portion 43 that is constituted by a lower side (a long side) of an isosceles trapezoidal cross section so as to have a groove shape in which a groove direction is in a thickness direction and a groove width increases with depth. The groove shape of the magnet interfitting groove 44 matches approximately with a cross-sectional shape of a bottom surface of the permanent magnet 41 that is constituted by a lower side (a long side) of the isosceles trapezoidal cross section.

In addition, the magnet holding seat 42 includes: an external shape reduced portion 45 that is prepared by cutting away an outer circumferential edge portion of a first end in a thickness direction of the columnar portion that has a major arc cross section to a predetermined thickness, and in which a width gradually becomes thinner away from the chord of the major arc; and an interfitting portion 46 that is constituted by a remaining portion of the columnar portion that has a major arc cross section. The external shape of the external shape reduced portion 45 conforms to an internal shape of a forked portion of the rotation arresting portions 31 of the bobbin 28. The interfitting portion 46 has a thickness that is approximately equal to a groove length of the interfitting groove 37 that is formed on the trough portion 35, and an external shape thereof conforms to a groove shape of the interfitting groove 37. Notches 47 that have a predetermined depth are disposed so as to extend from the first end in the thickness direction of the magnet holding seat 42 to a second end on two side surfaces of the magnet holding seat 42 at boundaries between the magnet holding portion 43 and the external shape reduced portion 45 and the interfitting portion 46.

As shown in FIG. 6A, the permanent magnet assembly 40 is assembled by fitting the permanent magnet 41 into the magnet interfitting groove 44 from the first end in the thickness direction of the magnet holding seat 42. Thus, the permanent magnet 41 is held in the magnet holding seat 42 so as to be connected magnetically by being fitted into the magnet interfitting groove 44 such that a bottom surface thereof faces a bottom surface of the magnet interfitting groove 44 in contact therewith or so as to leave a minute gap. Moreover, the permanent magnet 41 is held in the magnet holding seat 42 by the fitting force from the magnet interfitting groove 44, but an adhesive may also be applied if required.

As shown in FIG. 8, a permanent magnet assembly 40 that has been assembled in this manner is mounted into each of the trough portions 35 of the first pole core body 19 from axially inside the first pole core body 19 by inserting the interfitting portion 46 into the interfitting groove 37 until comes into contact with the bottom surface 37a. Here, radially outward movement of the permanent magnet assembly 40 is restricted by the groove shape of the interfitting groove 37 that has a major arc cross section, circumferential movement is restricted by the magnet holding portion 43 being inserted between the side surfaces of the trough portion 35 that face each other circumferentially, and axially outward movement is restricted by the interfitting portion 46 coming into contact with the bottom surface 37a of the interfitting groove 37.

The magnet holding seats 42 are held in each of the trough portions 35 of the first pole core body 19 so as to be connected magnetically by being fitted into the interfitting groove 37 such that an outer circumferential surface of the interfitting portion 46 faces an inner circumferential surface of the interfitting groove 37 in contact therewith or so as to leave a minute gap. Moreover, the magnet holding seats 42 are held in the trough portions 35 by the fitting force from the interfitting groove 37, but an adhesive may also be applied if required. Drippings that are formed during formation of the interfitting groove 37 on opening edge portions that are constituted by two ends of the interfitting groove 37 that has a major arc cross section are housed inside the notches 47 when the interfitting portion 46 is inserted inside the interfitting groove 37, and do not affect the mounting operation of the magnet holding seat 42 into the trough portions 35. Moreover, permanent magnet assemblies 40 are also mounted to the trough portions 35 of the second pole core body 23 in a similar manner.

To assemble the rotor 15, the first and second pole core bodies 19 and 23 in which a permanent magnet assembly 40 is mounted to each of the trough portions 35 are fixed to the shaft 16 that has been fitted through the shaft insertion apertures such that the first and second claw-shaped magnetic pole portions 22 and 26 alternately intermesh and a second end surface of the first boss portion 20 is abutted to a first end surface of the second boss portion 24. Here, the first and second boss portions 20 and 24 and the first and second yoke portions 21 and 25 correspond to a boss portion and first and second yoke portions of the pole core 18.

In a rotor 15 that has been assembled in this manner, the field coil assembly 27 is housed in a space that is surrounded by the first and second boss portions 20 and 24, the first and second yoke portions 21 and 25, and the first and second claw-shaped magnetic pole portions 22 and 26 by inserting the first and second boss portions 20 and 24 inside the drum portion 29 of the bobbin 28. The cover portions 32 extend from outer circumferential edge portions of the pair of flange portions 30 so as to cover the field coil 17 that is wound onto the drum portion 29, ensuring electrical insulation between the field coil 17 and the first and second claw-shaped magnetic pole portions 22 and 26. The rotation arresting portions 31 of the bobbin 28 are housed inside spaces that are formed by the rotation arresting portion housing recess portions 36 that are formed on the first and second yoke portions 21 and 25 and the external shape reduced portions 45 that extend axially inward from the interfitting grooves 37, restricting rotation of the bobbin 28 and also performing circumferential positioning of the bobbin 28. In addition, end surfaces of the interfitting portions 46 come into contact with the rotation arresting portions 31, restricting axially inward movement of the permanent magnet assemblies 40.

Here, the permanent magnets 41 are disposed in the respective trough portions 35 so as to face inner circumferential surfaces near tip ends of the first and second claw-shaped magnetic pole portions 22 and 26, and are magnetically oriented so as to be opposite to an orientation of a magnetic field that the field current that flows through the field coil 17 produces in a plane that is perpendicular to a central axis of the rotor 15. Although not shown, output wires 17a of the field coil 17 are led out through lead grooves that are recessed into floor portions of two trough portions 35 of the second pole core body 23 so as to extend outward from axially inside, and are connected to the slip rings 8.

Next, operation of an automotive alternator 1 that has been configured in this manner will be explained.

First, electric current is supplied from a battery (not shown) to the field coil 17 of the rotor 15 by means of the brushes 9 and the slip rings 8, generating magnetic flux. The first claw-shaped magnetic pole portions 22 of the first pole core body 19 are magnetized into North-seeking (N) poles by this magnetic flux, and the second claw-shaped magnetic pole portions 26 of the second pole core body 23 are magnetized into South-seeking (S) poles.

At the same time, rotational torque from an engine is transmitted to the shaft 16 by means of a belt (not shown) and the pulley 6, rotating the rotor 15. Thus, a rotating magnetic field is applied to the stator coil 12 of the stator 10, generating electromotive forces in the stator coil 12. These alternating-current electromotive forces are rectified into direct current by the rectifier 13 to charge the battery or to be supplied to electric loads, etc.

Magnetic flux is generated when an electric current is passed through the field coil 17. This magnetic flux enters tooth portions of the stator core 11 by passing through the air gap from the first claw-shaped magnetic pole portions 22. The magnetic flux then moves circumferentially through a core back portion from the tooth portions of the stator core 11, and enters neighboring second claw-shaped magnetic pole portions 26 by passing through the air gap from the tooth portions that face those second claw-shaped magnetic pole portions 26. Next, the magnetic flux that has entered the second claw-shaped magnetic pole portions 26 passes through the second yoke portion 25, the second boss portion 24, the first boss portion 20, and the first yoke portion 21, and reaches the first claw-shaped magnetic pole portions 22. Now, in a conventional Lundell rotor, because the first and second pole core bodies are at their design limit, they are magnetically saturated by the magnetic field that is generated by the field coil, reducing magnetic flux that is generated by the rotor.

In Embodiment 1, the permanent magnets 41 are magnetically oriented so as to be opposite to the orientation of the magnetic field that is generated by the field coil 17. Thus, to interlink with the stator core 11, it is necessary for the magnetic flux that originates from the permanent magnets 41 to make a round trip across the air gap, which has a large magnetic resistance. The permanent magnets 41 are disposed radially inside the first and second claw-shaped magnetic pole portions 22 and 26, and are disposed so as to circuit in a shorter magnetic path length to the inner circumferential surface sides of the first and second claw-shaped magnetic pole portions 22 and 26. Thus, a large portion of the magnetic flux that originates from the permanent magnets 41 forms a closed magnetic circuit inside the rotor 15 without going around through the stator core 11.

In other words, the magnetic flux that originates from the permanent magnets 41 that are disposed in the trough portions 35 between the first claw-shaped magnetic pole portions 22 passes from the magnet holding seats 42 through the first yoke portion 21, the first boss portion 20, the second boss portion 24, the second yoke portion 25, and the second claw-shaped magnetic pole portions 26, and returns to the permanent magnets 41. The magnetic flux that originates from the permanent magnets 41 that are disposed in the trough portions 35 between the second claw-shaped magnetic pole portions 26 enters the first claw-shaped magnetic pole portions 22 by means of the gap, passes through the first yoke portion 21, the first boss portion 20, the second boss portion 24, the second yoke portion 25, and the magnet holding seats 42, and returns to the permanent magnets 41.

Thus, the magnetic flux that originates from the permanent magnets 41 is in a reverse direction from the magnetic flux 34a that originates from the field coil 17, enabling the magnetic flux density of the magnetic bodies that constitute the first and second pole core bodies 19 and 23 to be reduced significantly, thereby enabling magnetic saturation to be relieved.

According to Embodiment 1, interfitting grooves 37 that have major arc cross sections are formed on floor portions of each of the trough portions 35 of the first and second pole core bodies 19 and 23 outward from axially inside so as to have groove directions that are axial, and rotation arresting portion housing recess portions 36 are recessed into axially inner edge portions of the trough portions 35 of the first and second yoke portions 21 and 25 so as to have internal shapes that conform to the external shapes of the Y-shaped rotation arresting portions 31. The magnet holding seats 42 include: interfitting portions 46 that have external shapes that conform to the groove shapes of the interfitting grooves 37 that have major arc cross sections; and external shape reduced portions 45 that have external shapes that conform to internal shapes of forked portions of the rotation arresting portions 31 on first ends in the thickness direction of the interfitting portions 46.

Thus, the rotation arresting portions 31 can be housed inside spaces that are formed by the rotation arresting portion housing recess portions 36 and the external shape reduced portions 45 simply by mounting the field coil assembly 27 onto the first and second pole core bodies 19 and 23 in which the permanent magnet assemblies 40 have been mounted to the trough portions 35 by fitting the interfitting portions 46 of the magnet holding seats 42 into the interfitting grooves 37, and integrating the first and second pole core bodies 19 and 23. A rotor 15 in which rotation of the field coil assembly 27 around the shaft 16 is prevented can thereby be assembled easily. In addition, even if a high angular speed is applied to the bobbin 28 by operating the automotive alternator 1 at high speed, rotation of the field coil assembly 27 around the shaft 16 is prevented, enabling breakage of the output wires 17a of the field coil 17 to be prevented.

Because external shape reduced portions 45 that extend axially inward from the interfitting grooves 37 can be prepared so as to have shapes that do not interfere with the rotation arresting portions 31, conventional parts can be used for the bobbin 28, enabling costs to be reduced. In addition, because axially inner positions of the magnet holding seats 42 can be disposed closer to the field coil 17 and overlap between the permanent magnets 41 and the first and second claw-shaped magnetic pole portions 22 and 26 can be increased in an axial direction, magnetic flux that originates from the permanent magnets 41 flows between the permanent magnets 41 and the first and second claw-shaped magnetic pole portions 22 and 26 efficiently.

Because the interfitting grooves 37 do not pass through the trough portions 35 axially but have crescent-shaped bottom surfaces 37a that are perpendicular to an axial direction, axial positions of the magnet holding seats 42 can be positioned by fitting the interfitting portions 46 into the interfitting grooves 37 until end surfaces of the interfitting portions 46 come into contact with the bottom surfaces 37a. In addition, because the rotation arresting portions 31 are positioned axially inside the interfitting portions 46 that are fitted into the interfitting grooves 37, axial movement of the interfitting portions 46 is restricted by the bottom surfaces 37a and the rotation arresting portions 31.

Next, a specific construction of the magnet holding seats 42 will be explained with reference to FIGS. 9 through 12.

As shown in FIG. 9, a magnet holding seat 42 is prepared by laminating first and second thin plates 50 and 55 that are obtained by pressing and shaping magnetic steel plates.

As shown in FIGS. 10A and 10B, the first thin plates 50 are prepared so as to have a tapered shape in which a width becomes narrower toward a leading end, and a leading end portion thereof is a circular arc shape. Recessed grooves 51 in which a groove width becomes gradually wider toward the leading end are recessed into floor portions of the first thin plates 50. Pairs of crimped portions 52 are disposed so as to project at central portions of the first thin plates 50 so as to be spaced apart in a width direction. In addition, notches 53 are recessed into longitudinally central portions of two side portions of the first thin plates 50. Moreover, the recessed grooves 51, the crimped portions 52, and the notches 53 are formed simultaneously when the first thin plates 50 are pressed and shaped.

As shown in FIGS. 11A and 11B, the second thin plates 55 are prepared so as to have a composite shape that includes: a tapered shape in which a width becomes narrower toward a leading end; and a major arc shape that is linked to a leading end portion of the tapered shape. Recessed grooves 56 in which a groove width becomes gradually wider toward the leading end are recessed into floor portions of the second thin plates 55. Pairs of crimped portions 57 are disposed so as to project at central portions of the second thin plates 55 so as to be spaced apart in a width direction. In addition, notches 58 are recessed into two side portions of the second thin plates 55 at linking portions between the tapered shape and the major arc shape. Moreover, the recessed grooves 56, the crimped portions 57, and the notches 58 are formed simultaneously when the second thin plates 55 are pressed and shaped.

Here, the first and second thin plates 50 and 55 are prepared so as to have identical shapes except for portions near the leading ends from the notches 53 and 58. Portions of the second thin plates 55 near the leading ends from the notches 58 are prepared so as to be larger than the portions of the first thin plates 50 near the leading ends from the notches 53.

Respective predetermined numbers of first and second thin plates 50 and 55 are stacked together such that press punch directions are aligned. Here, the first and second thin plates 50 and 55 are laminated so as to be positioned by fitting protruding portions of the crimped portions 52 (57) into recess portions on rear surfaces of neighboring crimped portions 52 (57). The magnet holding seats 42 are then prepared by pressing the laminated body of first and second thin plates 50 and 55 from two sides in a direction of lamination so as to integrate the laminated body of first and second thin plates 50 and 55 by plastically deforming, crimping, and fixing the crimped portions 52 (57).

The recessed grooves 51 and 56 line up in the direction of lamination to constitute the magnet interfitting groove 44, and the notches 53 and 58 line up in the direction of lamination to constitute the notches 47. Portions of the first and second thin plates 50 and 55 that have been laminated near root ends from the notches 53 and 58 constitute the magnet holding portion 43. In addition, portions of the first thin plates 50 that have been laminated near the leading ends from the notches 52 constitute the external shape reduced portion 45, and portions of the second thin plates 55 that have been laminated near the leading ends from the notches 58 constitute the interfitting portion 46.

As shown in FIGS. 12A and 12B, external shape reduced portions 45 of magnet holding seats 42 that have been prepared in this manner are inserted inside the forked portions of the Y-shaped rotation arresting portions 31 of the bobbin 28, restricting circumferential rotation of the bobbin 28.

According to Embodiment 1, magnet holding seats 42 are prepared by laminating first and second thin plates 50 and 55 that are obtained by pressing and shaping magnetic steel plates. Thus, the magnet holding seats 42 can be prepared inexpensively compared to when prepared by molding. Modifications to the shape of the magnet holding seats 42 can also be accommodated easily, enabling manufacturing costs to be reduced.

Because the crimped portions 52 and 57 are respectively formed on the first and second thin plates 50 and 55, the laminated body of first and second thin plates 50 and 55 can be integrated simply by pressing from two sides in the direction of lamination. Thus, need for a welding step, etc., to integrate the laminated body of first and second thin plates 50 and 55 is eliminated, enabling manufacturing costs to be reduced. In addition, because two crimped portions 52 and 57 are respectively formed on the first and second thin plates 50 and 55, occurrence of misalignment in the step of stacking the first and second thin plates 50 and 55 is suppressed, enabling magnet holding seats 42 that have high dimensional precision to be prepared inexpensively.

Plate thickness of the first and second thin plates 50 and 55 will now considered.

There may be thickness irregularities in the magnetic steel plates that constitute the material for the first and second thin plates 50 and 55 that are unavoidable due to the manufacturing processes. Thus, the thickness irregularities are superimposed when the first and second thin plates 50 and 55 are laminated, making dimensional precision deteriorate. Moreover, because sixteen magnet holding seats 42 are mounted to the rotor 15, deterioration in the dimensional precision of individual magnet holding seats 42 may lower the overall power generating performance of the automotive alternator 1.

Steel plates that have a plate thickness less than 0.3 mm have increased thickness irregularities and also require a larger number of stacked plates. Increasing the number of stacked first and second thin plates 50 and 55 makes dimensional precision poor and also lowers workability. Steel plates that have a plate thickness greater than 2.0 mm, on the other hand, have reduced thickness irregularities and also enable the number of stacked plates to be reduced. However, if steel plates that have a plate thickness greater than 2.0 mm are used, it becomes impossible to match the thicknesses of the magnet holding seats 42, the external shape reduced portions 45, and the interfitting portions 46 to the groove length of the interfitting grooves 37 of the trough portions 35 and the shape of the rotation arresting portions 31 of the bobbin 28 with high precision. In particular, the shape of the rotation arresting portions 31 of the bobbin 28 is set so as to have a desired resistance against centrifugal forces, requiring dimension matching from the magnet holding seats 42. From the above, it is desirable for the plate thickness of the first and second thin plates 50 and 55 to be set to greater than or equal to 0.3 mm and less than or equal to 2.0 mm.

Moreover, in Embodiment 1 above, permanent magnets are disposed in all of the trough portions, but permanent magnets may also be disposed in selected trough portions. In that case, it is desirable to dispose the permanent magnets in a well-balanced manner circumferentially. For example, permanent magnets may also be disposed in all of the trough portions of the second pole core body while not disposing any permanent magnets in the first pole core body. Permanent magnets may also be disposed in every second trough portion in a circumferential direction in both the first and second pole core bodies. Alternatively, permanent magnet assemblies may also be disposed in every second trough portion in a circumferential direction in both the first and second pole core bodies, and only magnet holding seats disposed in remaining trough portions. Although adopting this kind of configuration reduces output slightly compared to when the permanent magnets are disposed in all of the trough portions, the number of parts can be reduced, enabling output to be increased using an inexpensive configuration.

Embodiment 2

Figure 13:
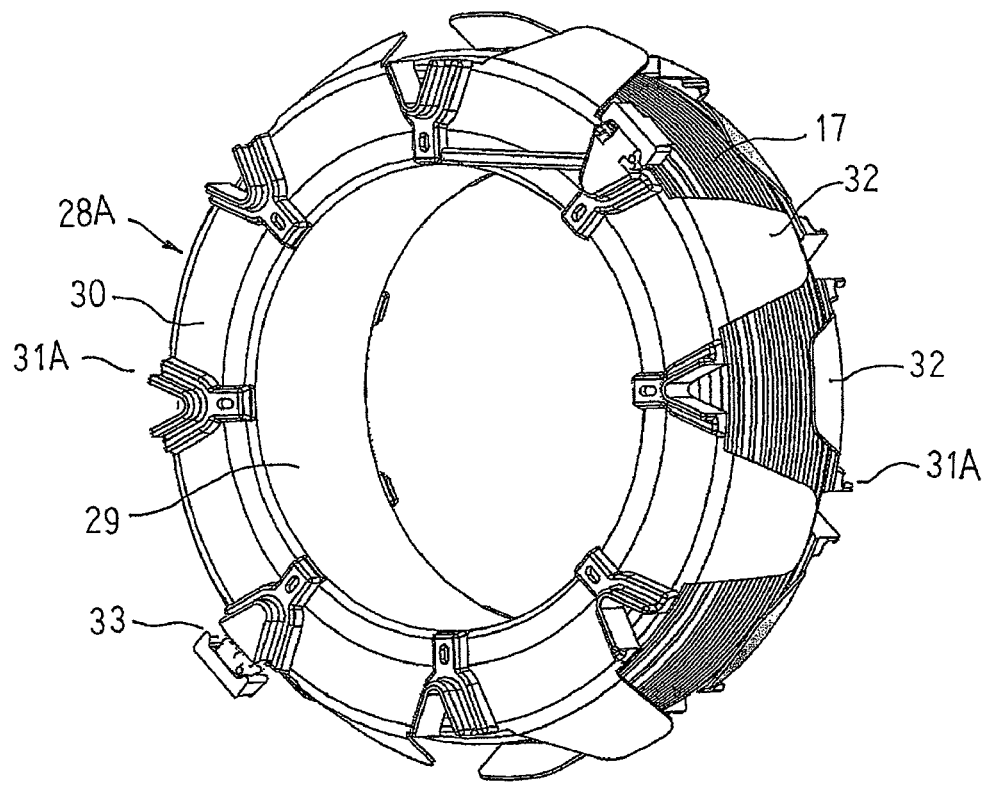
FIG. 13 is a perspective of a field coil assembly that can be installed in a rotor that can be used in the automotive alternator according to Embodiment 2 of the present invention.
Figure 14:
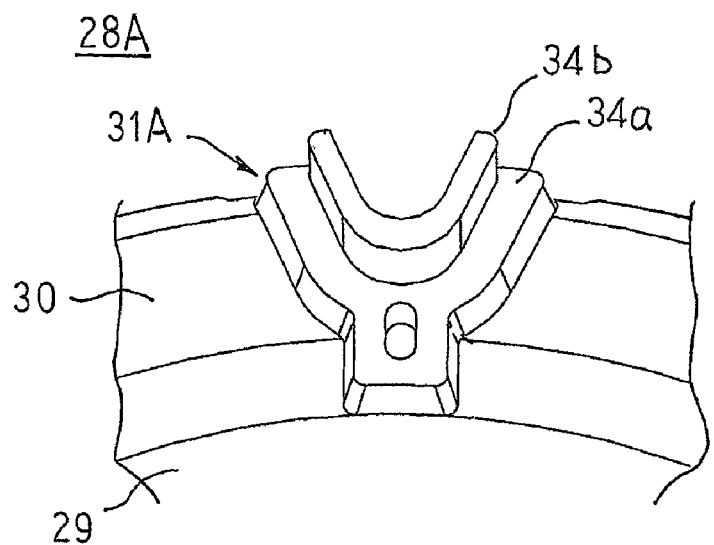
FIG. 14 is a side elevation of part of a bobbin of a field coil assembly that can be installed in the rotor that can be used in the automotive alternator according to Embodiment 2 of the present invention.
Figure 15A:
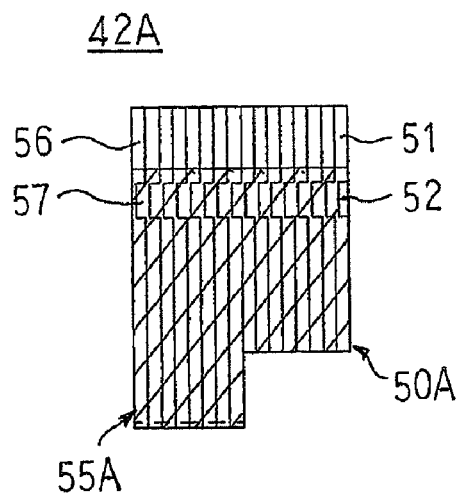
FIG. 15A is a cross section that explains a configuration of a magnet holding seat of a permanent magnet assembly in the automotive alternator according to Embodiment 2 of the present invention.
Figure 15B:
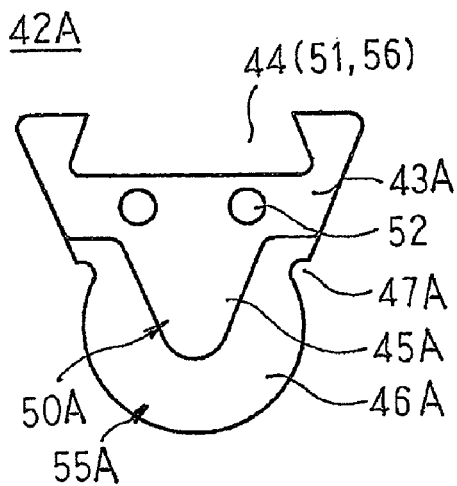
FIG. 15B is a front elevation that explains the configuration of the magnet holding seat of the permanent magnet assembly in the automotive alternator according to Embodiment 2 of the present invention.
Figure 16A:
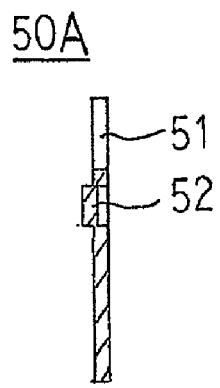
FIG. 16A is a cross section that explains the configuration of the magnet holding seat of the permanent magnet assembly in the automotive alternator according to Embodiment 2 of the present invention.
Figure 16B:
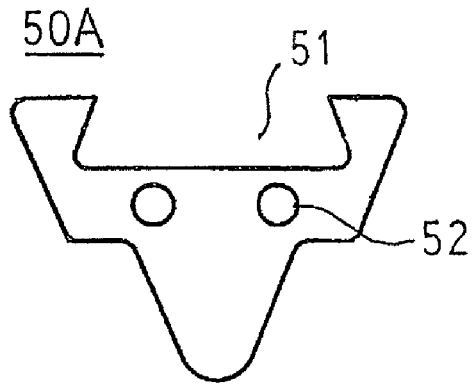
FIG. 16B is a front elevation that explains the configuration of the magnet holding seat of the permanent magnet assembly in the automotive alternator according to Embodiment 2 of the present invention.
Figure 17A:
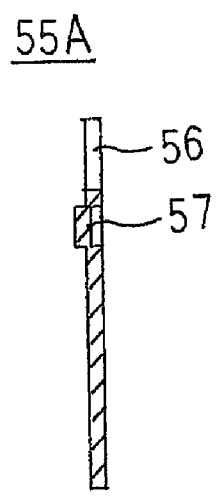
FIG. 17A is a cross section that explains the configuration of the magnet holding seat of the permanent magnet assembly in the automotive alternator according to Embodiment 2 of the present invention.
Figure 17B:
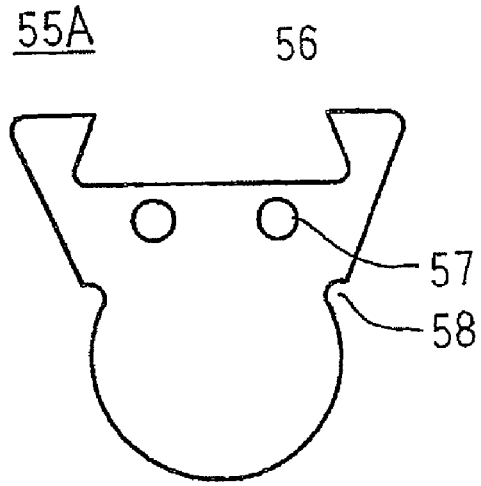
FIG. 17B is a front elevation that explains the configuration of the magnet holding seat of the permanent magnet assembly in the automotive alternator according to Embodiment 2 of the present invention.
Figure 18A:
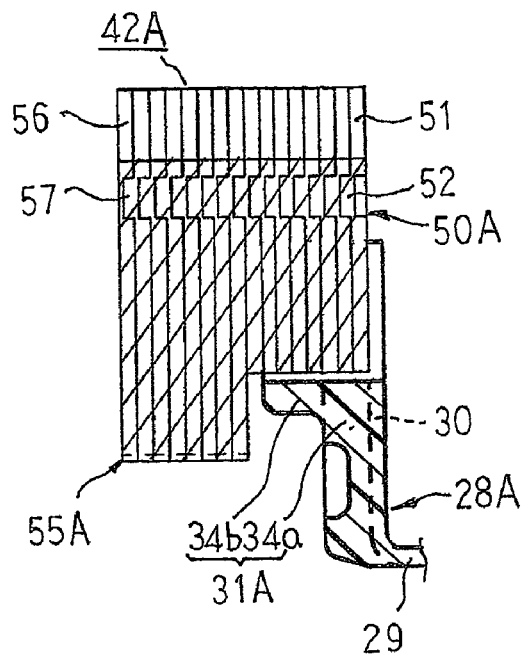
FIG. 18A is a cross section that explains a relationship between the magnet holding seat and a rotation arresting portion of the bobbin in the automotive alternator according to Embodiment 2 of the present invention.
Figure 18B:
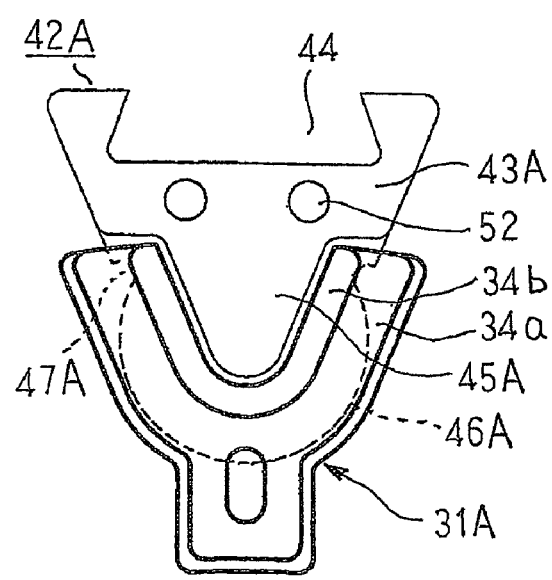
FIG. 18B is a front elevation that explains the relationship between the magnet holding seat and the rotation arresting portion of the bobbin in the automotive alternator according to Embodiment 2 of the present invention.

FIG. 13 is a perspective of a field coil assembly that can be installed in a rotor that can be used in the automotive alternator according to Embodiment 2 of the present invention, and FIG. 14 is a side elevation of part of a bobbin of a field coil assembly that can be installed in the rotor that can be used in the automotive alternator according to Embodiment 2 of the present invention. FIGS. 15A and 15B are diagrams that explain a configuration of a magnet holding seat of a permanent magnet assembly in the automotive alternator according to Embodiment 2 of the present invention, FIG. 15A showing a cross section thereof and FIG. 15B showing a front elevation. FIGS. 16A and 16B are diagrams that explain the configuration of the magnet holding seat of the permanent magnet assembly in the automotive alternator according to Embodiment 2 of the present invention, FIG. 16A showing a cross section thereof and FIG. 16B showing a front elevation. FIGS. 17A and 17B are diagrams that explain the configuration of the magnet holding seat of the permanent magnet assembly in the automotive alternator according to Embodiment 2 of the present invention, FIG. 17A showing a cross section thereof and FIG. 17B showing a front elevation. FIGS. 18A and 18B are diagrams that explain a relationship between the magnet holding seat and a rotation arresting portion of the bobbin in the automotive alternator according to Embodiment 2 of the present invention, FIG. 18A showing a cross section thereof and FIG. 18B showing a front elevation.

In FIGS. 13 and 14, a bobbin 28A is a resin-molded body that is made of an insulating resin, and includes: a drum portion 29 that is mounted so as to be fitted over first and second boss portions 20 and 24; a pair of flange portions 30 that are disposed so as to extend radially outward from two axial ends of the drum portion 29; six rotation arresting portions 31A and two output wire securing portions 33 that are disposed so as to project at a uniform angular pitch from each of the pair of flange portions 30; and cover portions 32 that are disposed so as to extend from outer circumferential edge portions of the pair of flange portions 30 so as to cover a field coil 17 that is wound onto the drum portion 29.

The output wire securing portions 33 are configured so as to have T-shaped thick portions that are disposed so as to project axially outward from each of the flange portions 30, and are disposed so as to be offset by 180 degrees. The rotation arresting portions 31A are constituted by: base portions 34a that are constituted by Y-shaped thick portions that are disposed so as to project axially outward from the respective flange portions 30; and U-shaped assembly positioning guides 34b that are disposed so as to protrude from forked portions of the base portions 34a, two sets of three rotation arresting portions 31A being disposed at a uniform angular pitch between the output wire securing portions 33. A field coil assembly 27A is prepared by winding a conducting wire that constitutes the field coil 17 into multiple layers on the drum portion 29 of the bobbin 28A.

As shown in FIGS. 15A and 15B, a magnet holding seat 42A is configured using a magnetic material into a columnar body that has a composite cross-sectional shape that aligns an upper side (a short side) of an isosceles trapezoid with a chord of a major arc and that has a thickness that is approximately equal to a length of a permanent magnet 41. A magnet holding portion 43A that is constituted by the columnar portion that has an isosceles trapezoidal cross section, is prepared so as to have a shape that can be fitted between side surfaces of a trough portion 35 that face each other circumferentially when the magnet holding seat 42A is mounted to the trough portion 35. A magnet interfitting groove 44 is recessed into a bottom surface of the magnet holding portion 43A that is constituted by a lower side (a long side) of an isosceles trapezoidal cross section.

In addition, the magnet holding seat 42A includes: an external shape reduced portion 45A that is prepared by cutting away an outer circumferential edge portion of a first end in a thickness direction of a columnar portion that has a major arc cross section to a predetermined thickness; and an interfitting portion 46A that is constituted by a remaining portion of the columnar portion that has a major arc cross section. The external shape of the external shape reduced portion 45A conforms to an internal shape of a forked portion of the rotation arresting portions 31A of the bobbin 28A. The interfitting portion 46A has a thickness that is approximately equal to a groove length of an interfitting groove 37 that is formed on the trough portion 35, and an external shape thereof conforms to a groove shape of the interfitting groove 37. Notches 47A that have a predetermined depth are disposed so as to extend from the first end in the thickness direction of the magnet holding seat 42A to a second end at positions on two side surfaces of the magnet holding seat 42A that are constituted by two end portions of the interfitting portion 46A that has a major arc cross section.

A magnet holding seat 42A that is configured in this manner is prepared by laminating first and second thin plates 50A and 55A that are obtained by pressing and shaping magnetic steel plates.

As shown in FIGS. 16A and 16B, the first thin plates 50A are prepared so as to have a composite shape that includes: an isosceles trapezoidal shape; and a tapered shape that is linked to a leading end portion of the isosceles trapezoidal shape. Recessed grooves 51 in which a groove width becomes gradually wider toward a leading end are recessed into floor portions of the first thin plates 50A. Pairs of crimped portions 52 are disposed so as to project at central portions of the first thin plates 50A so as to be spaced apart in a width direction. Moreover, the recessed grooves 51 and the crimped portions 52 are formed simultaneously when the first thin plates 50A are pressed and shaped.

As shown in FIGS. 17A and 17B, the second thin plates 55A are prepared so as to have a composite shape that includes: an isosceles trapezoidal shape and a major arc shape that is linked to a leading end portion of the isosceles trapezoidal shape. Recessed grooves 56 in which a groove width becomes gradually wider toward a leading end are recessed into floor portions of the second thin plates 55A. Pairs of crimped portions 57 are disposed so as to project at central portions of the second thin plates 55A so as to be spaced apart in a width direction. In addition, notches 58 are recessed into two side portions of the second thin plates 55A at linking portions between the isosceles trapezoidal shape and the major arc shape. Moreover, the recessed grooves 56, the crimped portions 57, and the notches 58 are formed simultaneously when the second thin plates 55A are pressed and shaped.

Respective predetermined numbers of first and second thin plates 50A and 55A are stacked together such that press punch directions are aligned. Here, the first and second thin plates 50A and 55A are laminated so as to be positioned by fitting protruding portions of the crimped portions 52 (57) into recess portions on rear surfaces of neighboring crimped portions 52 (57). The magnet holding seats 42 are then prepared by pressing the laminated body of first and second thin plates 50A and 55A from two sides in the direction of lamination so as to integrate the laminated body of first and second thin plates 50A and 55A by plastically deforming, crimping, and fixing the crimped portions 52 (57).

The recessed grooves 51 and 56 line up in the direction of lamination to constitute the magnet interfitting groove 44, and the notches 58 line up in the direction of lamination to constitute the notches 47. An isosceles trapezoidal shape laminated portion of the first and second thin plates 50A and 55A that have been laminated constitutes the magnet holding portion 43A. In addition, a tapered shape laminated portion of the first thin plates 50A that have been laminated constitutes the external shape reduced portion 45A, and a major arc-shaped laminated portion of the second thin plates 55A that have been laminated constitutes the interfitting portion 46A.

As shown in FIGS. 18A and 18B, external shape reduced portions 45A of magnet holding seats 42A that have been prepared in this manner are inserted inside the forked portions of the Y-shaped rotation arresting portions 31A of the bobbin 28A, restricting circumferential rotation of the bobbin 28A.

In Embodiment 2, magnet holding seats 42A in which permanent magnets 41 are held are mounted to six trough portions 35 on respective first and second pole core bodies 19 and 23 that do not include two other trough portions 35 that face each other radially. A field coil assembly 27A is installed in the first and second pole core bodies 19 and 23 such that output wire securing portions 33 are housed inside the trough portions 35 to which the magnet holding seats 42A are not mounted. Rotation arresting portions 31A are housed inside spaces that are formed by rotation arresting portion housing recess portions 36 that are recessed into axially inner edge portions of the trough portions 35 and external shape reduced portions 45A that extend axially inward from interfitting grooves 37. In addition, output wires 17a of the field coil 17 are wound onto the output wire securing portions 33, are extended outward from the trough portions 35, and are connected to slip rings 8.

Similar effects to those in Embodiment 1 above can also be achieved in Embodiment 2.

In Embodiment 2, because assembly positioning guides 34b are disposed so as to project in a U shape in forked portions of Y-shaped base portions 34a of the rotation arresting portions 31A, it is possible to increase positioning accuracy during coupling between the field coil assembly 27A and the first and second pole core bodies 19 and 23 by inserting assembly positioning guides 34b into the external shape reduced portions 45A of the magnet holding seats 42A, enabling the number of assembly defects to be reduced, and increasing productivity. In addition, mechanical strength of the rotation arresting portions 31A is increased by disposing the assembly positioning guides 34b so as to protrude from the base portions 34a, increasing reliability.

Because the magnet holding seats 42A are configured by laminating first and second thin plates 50A and 55A, interference with the assembly positioning guides 34b can be avoided simply by changing the number of stacked first and second thin plates 50A and 55A.

Moreover, in each of the above embodiments, two crimped portions are formed on the first and second thin plates, but the number of crimped portions is not limited to two. In particular, from the viewpoint of suppressing occurrences of misalignment in the step of laminating the first and second thin plates, it is preferable for the number of the crimped portions to be set to greater than or equal to two.

In each of the above embodiments, the magnet holding seats are prepared by laminating magnetic steel plates, but the magnet holding seats may be prepared by molding, etc.

In each of the above embodiments, the interfitting grooves are formed so as to have major arc cross sections, but it is only necessary for the cross-sectional shape of the interfitting grooves to be able to restrict circumferential and radial motion of the interfitting portions of the magnet holding seats that are fitted together with the interfitting grooves, and is not limited to a major arc.

In each of the above embodiments, explanations are given for automotive alternators, but the present invention is not limited to automotive alternators, and similar effects are also exhibited if the present invention is applied to other dynamoelectric machines such as automotive electric motors, automotive generator-motors, etc.

What is claimed is:

1. A dynamoelectric machine comprising:
    a rotor comprising:
        a pole core comprising:
            a boss portion;
            a pair of yoke portions that are disposed so as to extend radially outward from two axial end edge portions of said boss portion; and
            a plurality of claw-shaped magnetic pole portions that are disposed so as to extend in an axial direction alternately from each of said pair of yoke portions, and that are arranged circumferentially so as to intermesh with each other,
            a trough portion that curves radially inward being formed on a portion of each of said yoke portions between circumferentially adjacent claw-shaped magnetic pole portions, and said pole core being fixed to a shaft that is inserted through a central axial position of said boss portion; and
        a field coil that is wound onto a bobbin that is mounted to said boss portion, and that is housed inside a space that is surrounded by said boss portion, said pair of yoke portions, and said plurality of claw-shaped magnetic pole portions;
    a stator that is disposed so as to surround an outer circumference of said rotor; and
    a permanent magnet that is disposed in said trough portion so as to face an inner circumferential surface near a tip end of said claw-shaped magnetic pole portions,
    said dynamoelectric machine further comprising:
    an interfitting groove that is disposed in a bottom portion of said trough portion so as to have a groove direction that is axial and so as to extend axially outward from axially inside;
    a rotation arresting portion housing recess portion that is recessed into an axially inner opening edge portion of said interfitting groove on said yoke portions;
    a magnet holding seat that is disposed in said trough portion by being fitted into said interfitting groove such that radial movement is restricted, and that holds said permanent magnet; and
    a rotation arresting portion that is disposed so as to project axially outward from a flange portion of said bobbin,
    wherein said rotation arresting portion is housed inside a space that is constituted by said rotation arresting portion housing recess portion and said magnet holding seat such that rotation of said bobbin around said shaft is restricted.

2. The dynamoelectric machine according to claim 1, wherein:
    said magnet holding seat comprises:
        an interfitting portion that is fitted into said interfitting groove; and
        an external shape reduced portion that is formed integrally with said interfitting portion, and that extends axially inward from said interfitting groove; and
    said rotation arresting portion is housed inside a space that is constituted by said rotation arresting portion housing recess portion and said external shape reduced portion.

3. The dynamoelectric machine according to claim 1, wherein a stopping portion that sets an axial position of said magnet holding seat by coming into contact with an axially outer end surface of said interfitting portion that is fitted into said interfitting groove is disposed on said interfitting groove.

4. The dynamoelectric machine according to claim 1, wherein an assembly positioning guide is disposed so as to project from said rotation arresting portion.

5. The dynamoelectric machine according to claim 1, wherein said magnet holding seat is prepared by laminating a plurality of magnetic steel plates.

6. The dynamoelectric machine according to claim 5, wherein:
    said plurality of magnetic steel plates each have two or more crimped portions; and
    said plurality of magnetic steel plates that have been laminated are integrated by driving protruding portions of said crimped portions of one of said magnetic steel plates into recessed portion of said crimped portions of a neighboring magnetic steel plate.

7. The dynamoelectric machine according to claim 5, wherein a plate thickness of said magnetic steel plates is greater than or equal to 0.3 mm and less than or equal to 2.0 mm.

* * * * *